United States Patent
Shih

[19]

[11] Patent Number: 6,124,010
[45] Date of Patent: Sep. 26, 2000

[54] SEAM STRUCTURE OF FOAM SHEETS FOR SPORTSWEAR PRODUCTS

[75] Inventor: Arthur Tseshao Shih, S. El Monte, Calif.

[73] Assignee: Peca Corporation, S. El Monte, Calif.

[21] Appl. No.: 09/295,895

[22] Filed: Apr. 21, 1999

[51] Int. Cl.[7] ........................................ B32B 3/10
[52] U.S. Cl. ................................ 428/61; 428/60
[58] Field of Search ........................ 428/60, 61; 2/275; 156/304.5

[56] References Cited

U.S. PATENT DOCUMENTS 3,093,935  6/1963  Dunn ........................................ 428/60
4,755,429  7/1988  Nickols et al. .

FOREIGN PATENT DOCUMENTS

922746  4/1963  United Kingdom ..................... 428/60

Primary Examiner—Alexander S. Thomas
Attorney, Agent, or Firm—Raymond Y. Chan; David and Raymond

[57] ABSTRACT

A seam structure for connecting two foam sheets in edge-to-edge manner, wherein the connection surfaces (i.e. the adhering area) between the edge joints of the two foam sheet are respectively enlarged without increasing the thickness of the foam sheets, allows two foam sheets of a thinner width than is used with conventional seam structures to be connected with sufficient strength to overcome horizontal separating forces. The seam structure includes a base edge joint provided at an end edge of the first foam sheet and a covering edge joint provided at an end edge of the second foam sheet. The base edge joint has a root portion and an end portion defining a base connection surface extended sidewardly from the root portion to the end portion. The covering edge joint has a root portion and an end portion defining a covering connection surface extended sidewardly from the root portion to the end portion thereof. Therefore, the covering connection surface is adapted to be sealingly adhered on the base connection surface so as to overlappingly connect the covering edge joint with the base edge joint.

8 Claims, 10 Drawing Sheets

SEAM STRUCTURE OF FOAM SHEETS FOR SPORTSWEAR PRODUCTS

FIELD OF THE PRESENT INVENTION

The present invention relates to wader and diving products, and more particularly to a seam structure for constructing sportswear products such as waders, diving suits and wetsuits, which can more strongly and firmly connect two thinner foam sheets edge by edge together in waterproof manner.

BACKGROUND OF THE PRESENT INVENTION

Various kinds of waterproof and/or heat insulation sportswear are provided in market for outdoor sports such as hunting, fishing, diving, and etc. In order to ensure waterproof and heat insulation features, sportswear products such as such as waders, diving suits and wetsuits are constructed with various kinds of foam sheet material, such as Neoprene or rubber.

Figure 1:
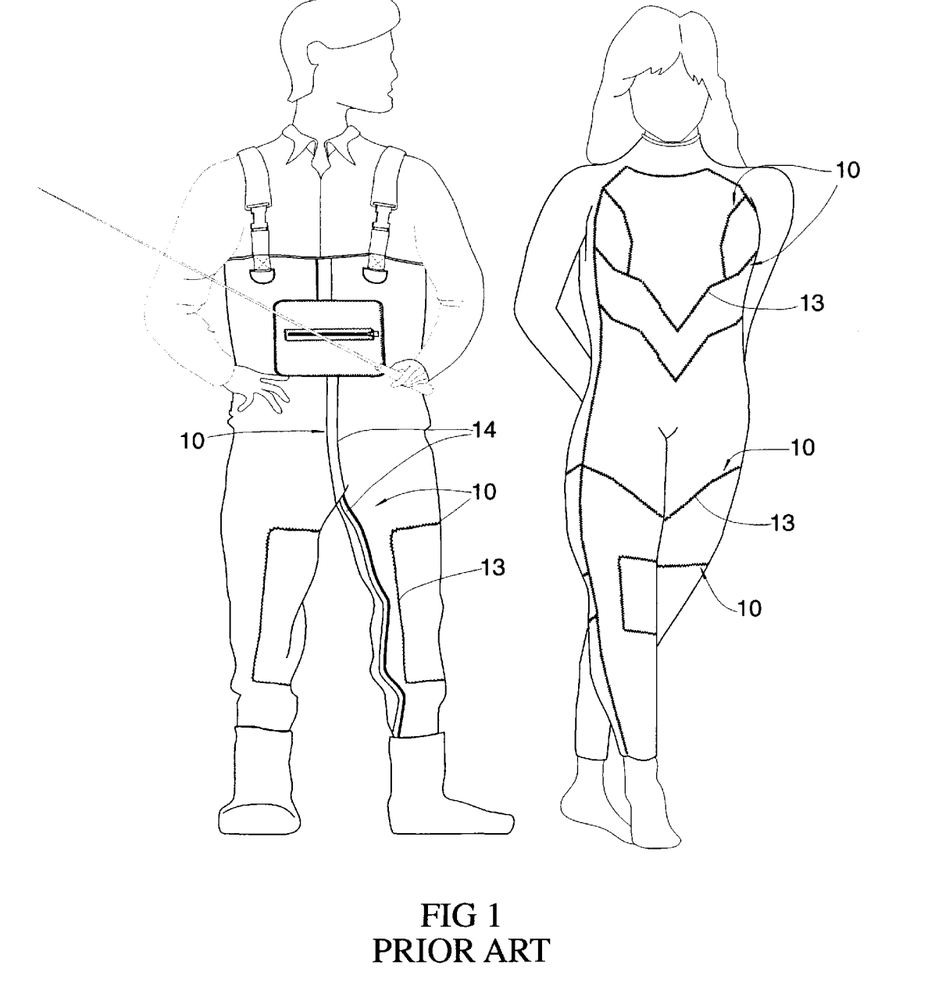
FIG. 1 is a schematic view illustrating the conventional stitched seam structure on fishing waders and diving sportswear.
Figure 2:
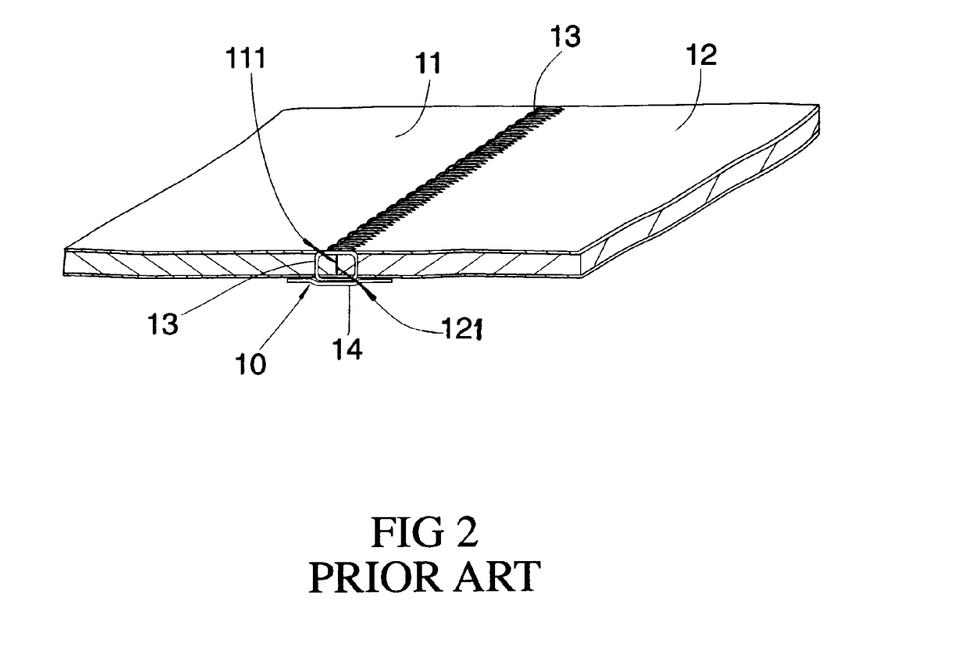
FIG. 2 is a sectional view of the conventional stitched seam structure with fabric tape covered.

Normally, two side surfaces of the foam sheet are respectively coated with fabric, for example the nylon jersey knit, plush or cotton. Like the production of clothing, a large foam sheet is cut to pieces, which are connected edge to edge to form the wader, diving suit or wetsuit, as shown in FIG. 1. Practically, foam sheet material does not like the general clothing fabric that can be sewn to form the seams. As shown in FIG. 2, a conventional seam structure 10 for connecting two foam sheets 11, 12 together edge to edge is illustrated, wherein the conventional seam structure 10 is constructed by the following steps:

1. Apply adhesive such as neoprene base glue to the two vertical end edges 111, 121 of the two foam sheets 11, 12 respectively.

2. Attach the two end edges 111, 121 of the two foam sheets 11, 12 together.

3. Clamp the two connecting edges 111, 121 together so as to press the two end edges 111, 121 against each other until the two end edges 111, 121 are adhered together.

4. Blind stitch up the one or two end edges 111, 121 to form a stitching seam 13 to reinforce the adhering connection of the two end edges 111, 121 of the two foam sheets 11, 12.

5. Fabric tapes 14 can be glued to cover the stitching seam 13 on either one side or both sides if waterproof feature is required.

In view of the above disclosed conventional seam structure, in order to provide good connection between the two vertical end edges 111, 121 of the two foam sheets 11, 12, the thickness of the foam sheet 11 or 12 must only be varied from 2 mm to 7 mm. No foam sheet thinner than 2 mm can be used because it is extremely difficult to firmly glue such thin end edges together. Therefore, there is no way to reduce the thickness of the whole sportswear product as long as the foam sheets are connected together by the conventional seam structure as shown in FIGS. 1 and 2.

The strength of the conventional seam structure as shown in FIG. 2 is proportional to the gluing area between the end edges 111, 121, i.e. the length of the end edge 111 or 121 times the thickness thereof. In other words, the thickness of the foam sheet 11, 12 determines the connecting strength of the conventional seam structure. The vertical connection between the two end edges 111, 121 is a relatively weak connection, especially when a horizontal force is applied to the foam sheet 11, 12. Therefore, mechanically speaking, the conventional seam structure is not a reasonable structure to provide liable and good connection between foam sheets.

SUMMARY OF THE PRESENT INVENTION

The main object of the present invention is to provide a seam structure for connecting two foam sheets in edge-to-edge manner, wherein the connection surfaces (i.e. the adhering area) between the edge joints of the two foam sheet are respectively enlarged without increasing the thickness of the foam sheets.

Another object of the present invention is to provide a seam structure for connecting two foam sheets in edge-to-edge manner, wherein simply by applying adhesive substance such as glue to the enlarged connection surfaces of the edge joints of the two foam sheets can provide a strong seam structure that firmly connects the two foam sheets together, even without the need for stitching, or fabric tapes, while still providing waterproof and insulation features for sportswear constructed from the foam sheets.

Another object of the present invention is to provide a seam structure for connecting two foam sheets in edge-to-edge manner, wherein the seam structure can reduce the separating force from any horizontal pulling of the fabric, while increasing frictional surface contact between the foam sheets for holding the foam sheets together, thereby increasing the adhesion, waterproofing features, and heat insulation features of the foam sheets for sportswear constructed from the foam sheets.

Another object of the present invention is to provide a seam structure for two foam sheets having enlarged edge joints for adhering the two foam sheets together, that allows two foam sheets of a thinner width than is used with conventional seam structures to be connected with sufficient strength to overcome horizontal separating forces.

Accordingly, in order to accomplish the above objects, the present invention a seam structure for connecting a first foam sheet and a second foam sheet to form an integrated foam sheet having even thickness, wherein the seam structure comprises:

a base edge joint provided at an end edge of the first foam sheet, the base edge joint having a root portion and an end portion defining a base connection surface extended sidewardly from the root portion to the end portion; and a covering edge joint provided at an end edge of the second foam sheet, the covering edge joint having a root portion and an end portion defining a covering connection surface extended sidewardly from the root portion to the end portion thereof, wherein the covering connection surface is adapted to be sealingly adhered on the base connection surface so as to overlappingly connect the covering edge joint with the base edge joint.

DETAILED DESCRIPTION OF THE PREFERRED EMBODIMENT

Figure 3:
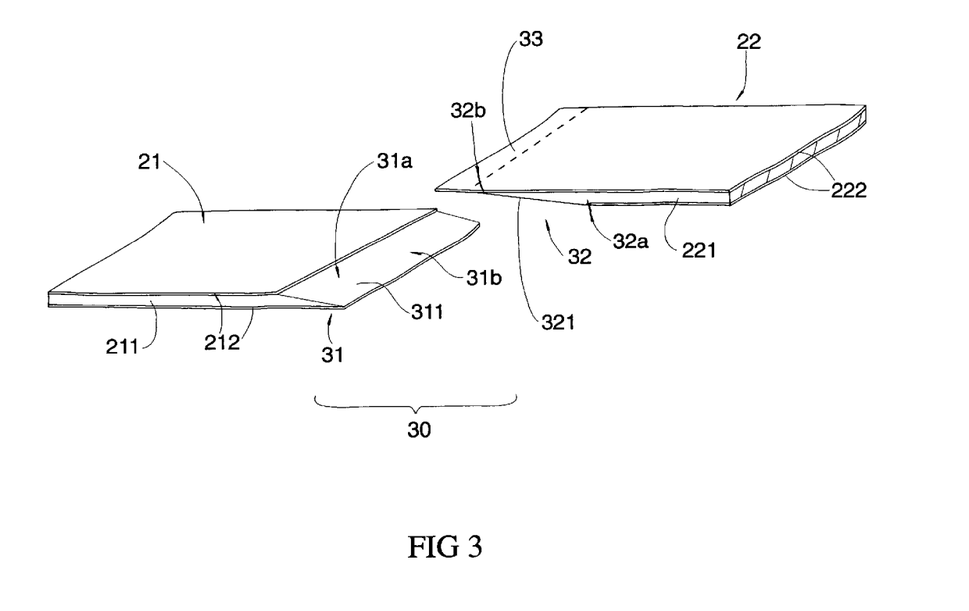
FIG. 3 is an exploded perspective view of two edge joints of two foam sheets before connecting to form the seam structure according to a preferred embodiment of the present invention.
Figure 4:
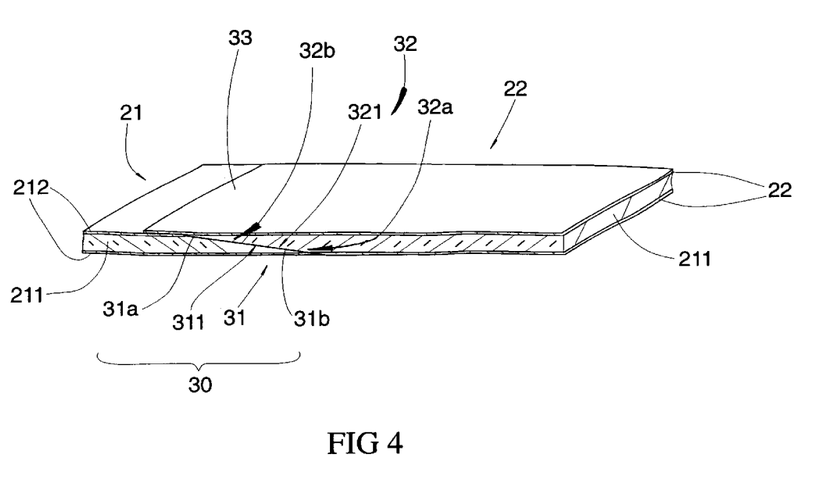
FIG. 4 is a sectional perspective view of the seam structure according to the above preferred embodiment of the present invention, showing the connection effected by the seam structure and an integrally attached overlapping flap for enhanced insulation and waterproofing.

Referring to FIGS. 3 and 4, a seam structure 30 of connecting two edge joints of two foam sheets is illustrated, according to a preferred embodiment of the present invention. Each of the two foam sheets 21, 22 comprises a sheet body 211, 221 having a predetermined thickness made of foaming material such as neoprene or rubber, and two fabric layers 212, 222, made of nylon jersey knit, plush or cotton, are respectively coated on two sides of the sheet body 211, 221.

In order to connect two foam sheets 21, 22 to form an integrated foam sheet having larger surface area and same even thickness, or to connect pieces of foam sheet made component to construct a sportswear, the first foam sheet 21 provides at least a base edge joint 31 and the second foam sheet 22 forms at least a covering edge joint 32 adapted to connect with the base edge joint 31 to construct the seam structure 30 of the present invention.

The seam structure 30 forms a tight seal joint that integrally connects the covering edge joint 32 with the base edge joint 31 of the two foam sheets 21, 22. Since normally the two foam sheets 21, 22 have the same predetermined thickness, the seam structure 30 is preferred to have a thickness equal to the thickness of the foam sheet 21, 22, that is why the conventional seam structure as shown in FIG. 2 does not simply overlapping the two end edges of the two foam sheets but connects the two vertical end edges directly side by side in order to avoid doubling the thickness.

According to the preferred embodiment of the present invention, as shown in FIGS. 3 and 4, the base edge joint 31 of the first foam sheet 21 has a root portion 31a and an end portion 31b defining a slant base connection surface 311 extended sidewardly from the root portion 31a to the end portion 31b. The thickness of the root portion 31a equals to the thickness of the first foam sheet 21 and the thickness of the end portion 31b reduces to the thickness of the bottom fabric layer 212. In other words, the sheet body 211 is cut inclinedly to gradually reduce the thickness of the base edge joint 31 from the root portion 31a to the end portion 31b so as to form the slant base connection surface 311 facing upwards.

As shown in FIGS. 3 and 4, the covering edge joint 32 of the second foam sheet 22 also has a root portion 32a and an end portion 32b defining a slant covering connection surface 321 extended sidewardly from the root portion 32a to the end portion 32b. The thickness of the root portion 32a equals to the thickness of the second foam sheet 22 and the thickness of the end portion 32b reduces to the thickness of the top fabric layer 222. In other words, the sheet body 221 is cut inclinedly to gradually reduce the thickness of the base edge joint 31 from the root portion 32a to the end portion 32b so as to form the slant covering connection surface 321 facing downward.

As shown in FIG. 4, the inclined angles of the slant base connection surface 311 and the slant covering connection surface 321 should be equal with each other correspondingly, so as to adapt for overlapping with each other. Accordingly, to connect the first and second foam sheets 21, 22 edge-to-edge, adhesive substance is evenly applied to both the slant base connection surface 311 and the slant covering connection surface 321. Then, press the slant covering connection surface 321 against the slant base connection surface 311 until the base and covering connection surfaces 311, 321 are firmly adhered with each other, so that the covering edge joint 32 is overlappingly connected on top of base edge joint 31 to form the seam structure 30 of the present invention.

The seam structure 30 further comprises a covering flap 33 adhered to overlap the top seam of the base edge joint 31 and the covering edge joint 32, for further sealing the connection between the root portion 31 a of the base edge joint 31 and the end portion 32b of the covering edge joint 32 for advance insulation and waterproofing.

According to the preferred embodiment, as shown in FIGS. 3 and 4, the covering flap 33 is an additional end extension of the top fabric layer 222 which is integrally extended from the end portion 32b of the covering edge joint 32 and is glued on top of the top fabric layer 212 of the first foam sheet 21. Therefore, the covering flap 33 of the present preferred embodiment, which is integrally extended from the covering edge joint 32 of the second foam sheet 22, not only can increase the adhesive connection power of the seam structure 30 in order to against any separation force applied to the first and second foam sheet 21, 22, but also can further provide better insulation and waterproofing effects.

According to the seam structure 30 disclosed in the preferred embodiment of the present invention, the following unexpected and practical effects can thus be achieved:

1. The connection surfaces between the two foam sheets 21, 22 are substantially the slant base connection surface 31 and the slant covering connection surface 32, each of which provides much larger adhering surface area, i.e. the length x the width of the slant base connection surface 31 or the slant covering connection surface 32, so that the connection (i.e. the adhering power) of the seam structure 30 is largely enhanced without increasing the thickness of the foam sheets 21, 22. Therefore, by incorporating the seam structure 30 of the present invention, foam sheet 21 or 22 as thin as 2 mm can be used to produce sportswear while the connecting force between the end edges of two foam sheets can be maintained or even increased by simply forming a more inclined base and covering connection surfaces 31, 32.

2. The connection between the slant base connection surface 31 and the slant covering connection surface 32 provides an inclined edge connection between the two foam sheets 21, 22, that forms a stronger connection than the conventional vertical edge connection as illustrated in FIG.

2. It is because the separation forces, which are applied to the two foam sheets 21, 22 in opposite direction in order to attempt pulling the two foam sheets 21, 22 apart to separate the seam structure 30, each will be diverged into a larger longitudinal partial force and a smaller transverse partial force, wherein only the smaller transverse partial forces which are perpendicular to the base and covering connection surfaces 311, 321 are the substantial forces acting to separate the two base edge joint 31 and the covering edge joint 32 of the seam structure 30. In order words, the inclined connection of the seam structure 30 for connecting foam sheets as suggested in the present invention practically weakens the separation forces and thus can provide a stronger connection.

3. The overlapping connection between base and covering connection surfaces 31, 32 can be operated in an easier and more precise manner because of the increase of the connection surface area, in comparison with the conventional vertical end connection. According to the present invention, one can simply overlap the covering edge joint 32 on the base edge joint 31 so as to connect the two edge joints 31, 32 together, wherein no specific alignment skill is required but higher precision can be achieved.

4. The adhering surfaces, i.e. the base and covering connection surfaces 311, 321, of the seam structure 30 of the present invention can be increased without increasing the thickness of the foam sheets 21, 22 and maintaining an overall thickness of seam structure 30 equal to the thickness of the foam sheets 21, 22.

Based on the creative concept introduced by the above preferred embodiment of the present invention, various alternative modes can be derived from the above preferred embodiment to include the basic configuration with minor alternative modification.

Figure 5:
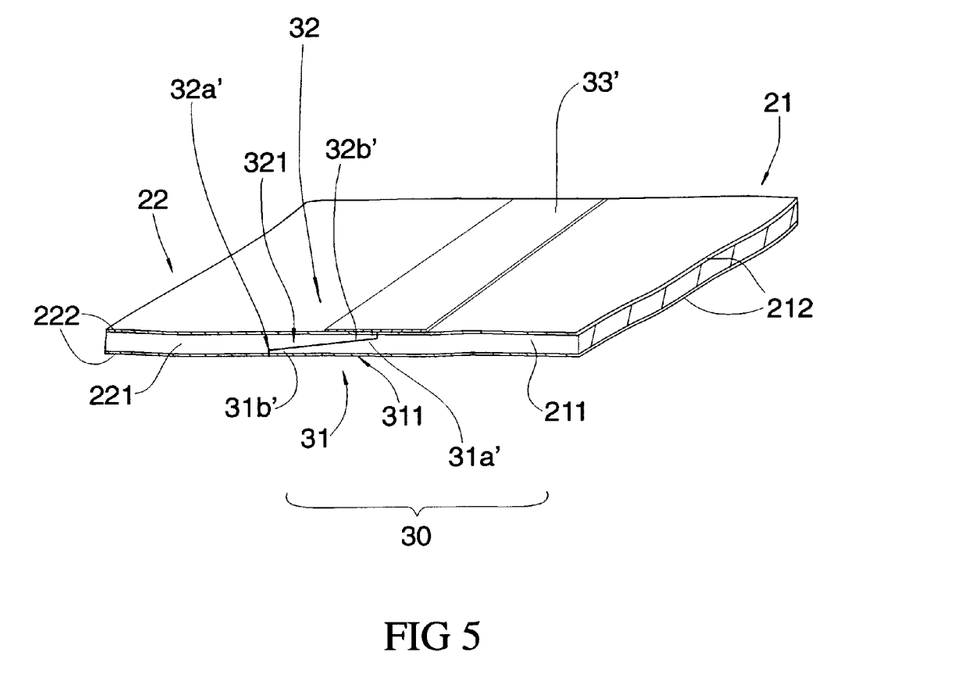
FIG. 5 is a sectional perspective view of a seam structure according to a first alternative mode of the above preferred embodiment of the present invention, showing a strip of fabric tape attached thereon.

Referring to FIG. 5, a first alternative mode of the seam structure 30' according to the above preferred embodiment is illustrated, wherein the end portions 31b' and 32b' of the base and covering edge joints 31, 32 each comprises the top fabric layer 212 or 222 and a thin thickness of the sheet body 211 or 221. Moreover, an independent covering flap 33' is used to sealedly glue along the top seam of the base and covering edge joints 31, 32 of the two foam sheets 21, 22 for covering the connection between the root portion 31a' of the base edge joint 31 and the end portion 32b' of the covering edge joint 32 for ensuring insulation and waterproofing.

Figure 6:
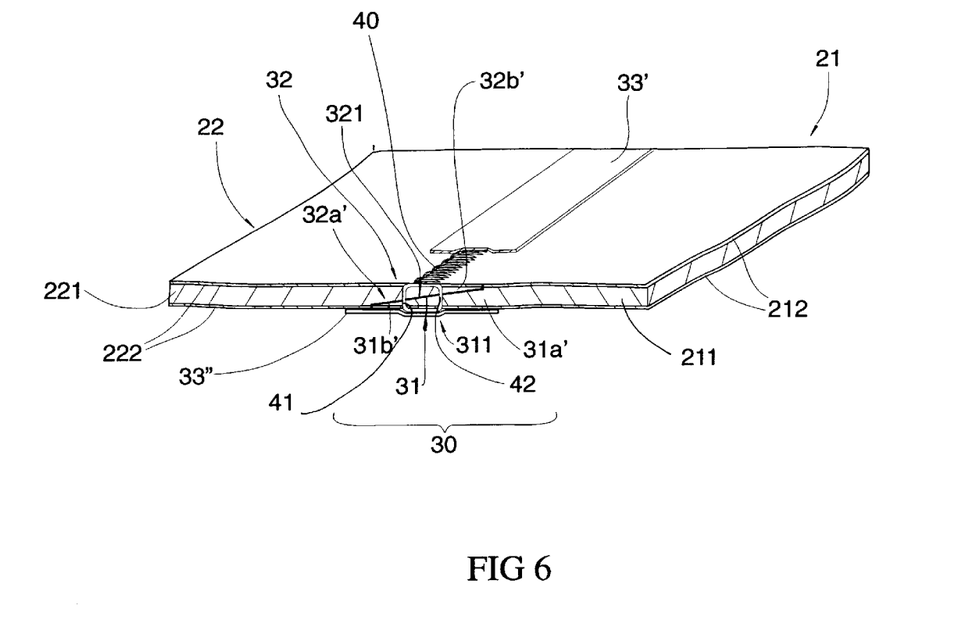
FIG. 6 is a sectional view of a seam structure according to a second alternative mode of the above preferred embodiment according to the present invention, which includes an enforced stitching structure and two additional strips of fabric tape attached on both sides.

FIG. 6 illustrates a second alternative mode of the above preferred embodiment, wherein the seam structure 30" is improved from the first alternative mode of seam structure 30' as shown in FIG. 5. The seam structure 30" further comprises a stitching seam 40 to blind stitch up the base edge joint 31 and the covering edge joint 32 in order to reinforce the adhering connection between the slant base connection surface 311 and the slant covering connection surface 321 of the two foam sheets 21, 22. It should be noted that due to the inclining connection between the base and covering edge joints 31, 32, each vertical stitching thread 41, 42 is substantially penetrated through both the base edge joint 31 and the covering edge joint 32, so as to provide such inter-securing seam structure 30", which is much more stronger than the conventional seam structure as shown in FIG. 2. Moreover, a bottom covering flap 33" is also glued along the bottom seam of the base and covering edge joints 31, 32 of the two foam sheets 21, 22 for covering the connection between the root portion 32a' of the covering edge joint 32 and the end portion 31b40 of the base edge joint 31 for further ensuring insulation and waterproofing.

Figure 7:
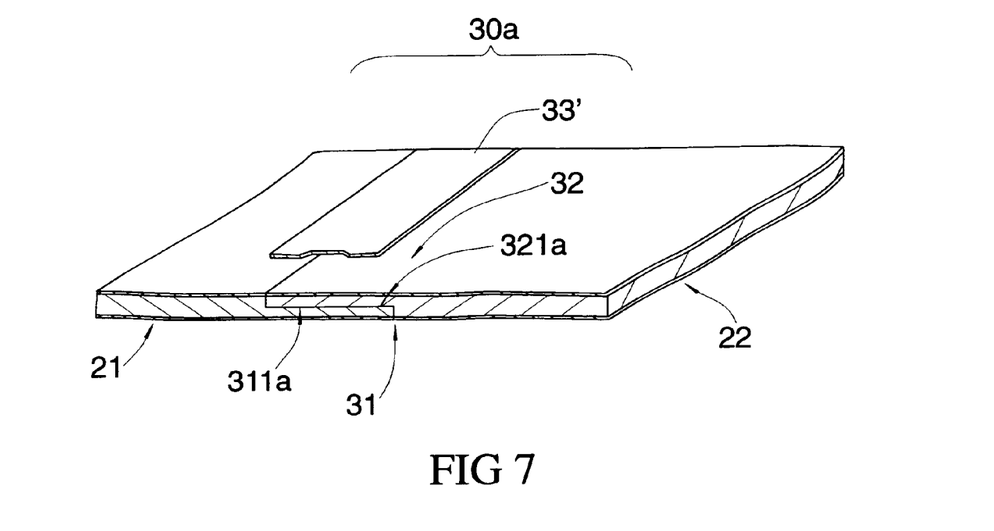
FIG. 7 is a sectional perspective view of a seam structure according to a third alternative mode of the above preferred embodiment of the present invention.

Referring to FIGS. 7 to 10, four more alternative modes of the above preferred embodiment are illustrated. As shown in FIG. 7, a third alternative mode is illustrated, wherein each of the base and covering connection surfaces 311, 321 of the base and covering edge joints 31, 32 has a L-shaped cross section to respectively define a base horizontal connection surface 311a and a covering horizontal connection surface 321a. The seam structure 30a of this third alternative mode can also achieve similar advantages such as increasing the connection surface area without increasing the thickness of the foam sheets 21, 22.

Figure 8:
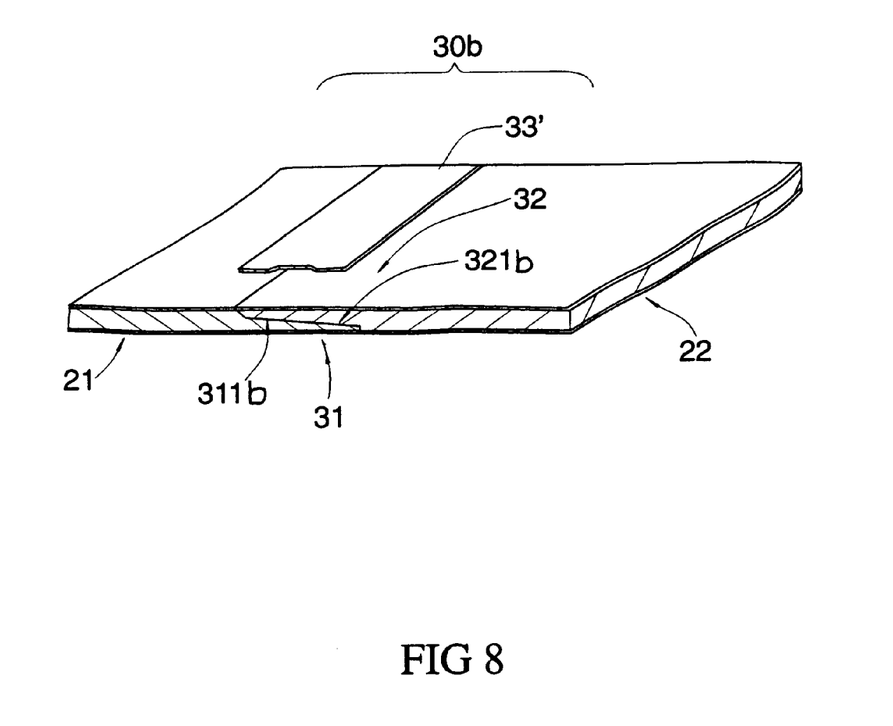
FIG. 8 is a sectional perspective view of a seam structure according to a fourth alternative mode of the above preferred embodiment of the present invention.

FIG. 8 illustrates a fourth alternative mode of the seam structure 30b of the above preferred embodiment, wherein the base and covering connection surfaces 311b, 321b of the base and covering edge joints 31, 32 are respectively contributed by two slant connection surfaces with different inclined angles. The seam structure 30b of this fourth alternative mode can also achieve similar advantages such as increasing the connection surface area without increasing the thickness of the foam sheets 21, 22.

Figure 9:
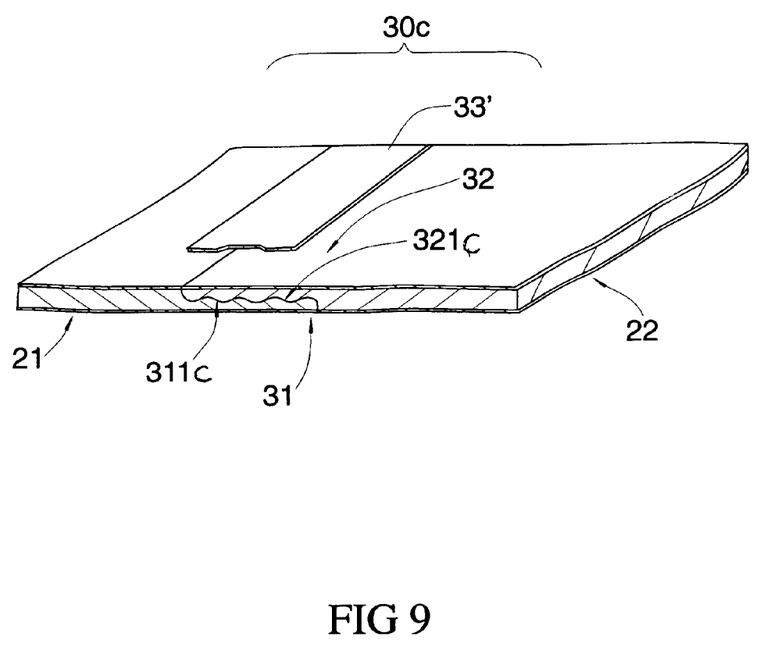
FIG. 9 is a sectional perspective view of a seam structure according to a fifth alternative mode of the above preferred embodiment of the present invention.
Figure 10:
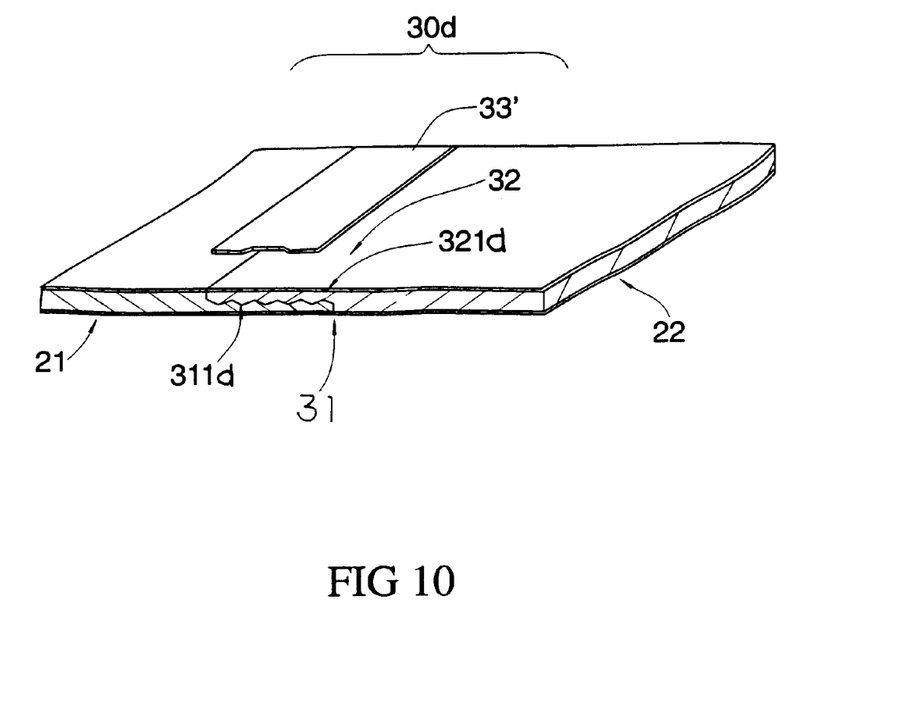
FIG. 10 is a sectional perspective view of a seam structure according to a sixth alternative mode of the above preferred embodiment of the present invention.

As shown in FIG. 9, a fifth alternative mode of the seam structure 30c is illustrated, wherein the base and covering connection surfaces 311, 321 of the base and covering edge joints 31, 32 are respectively substituted by a base wave-form surface 311c and a covering wave-form surface 321c. Also, as shown in FIG. 10, a sixth alternative mode of the seam structure 30c is illustrated, wherein the base and covering connection surfaces 311, 321 of the base and covering edge joints 31, 32 are respectively substituted by a base v-shaped teeth surface 311d and a covering v-shaped teeth surface 321d. The seam structures 30c and 30d of these fifth and sixth alternative modes can also achieve advantages such as increasing the connection surface area without increasing the thickness of the foam sheets 21, 22 and creating an inherent brace against any horizontal separating forces exerted on the foam sheets 21, 22.

It must be emphasized that the stitching seam 40 and/or the bottom covering flap 33" in the second alternative mode as illustrated in FIG. 6 can be comprised of and applied in the third, fourth, fifth, and sixth alternative modes as shown in FIGS. 7 to 10.

What is claimed is:

1. A seam structure for connecting a first foam sheet and a second foam sheet to form an integrated foam sheet having even thickness, wherein each of said two foam sheets comprises a sheet body having a predetermined thickness made of foaming material and two fabric layers coated on two sides of said sheet body, said seam structure comprising:

a base edge joint provided at an end edge of said first foam sheet, said base edge joint having a root portion and an end portion defining a base connection surface extended sidewardly from said root portion to said end portion; and a covering edge joint provided at an end edge of said second foam sheet, said covering edge joint having a root portion and an end portion defining a covering connection surface extended sidewardly from said root portion to said end portion thereof, wherein said covering connection surface is adapted to be sealingly adhered on said base connection surface so as to overlappingly connect said covering edge joint with said base edge joint.

2. The seam structure as recited in claim 1 wherein said base connection surface and said covering connection surface are slant surfaces having same inclined angle adapted for overlapping with each other.

3. The seam structure as recited in claim 2 wherein a thickness of said root portion of said base edge joint equals to a thickness of said first foam sheet and a thickness of said end portion of said base edge joint reduces to a thickness of said bottom fabric layer of said first foam sheet, said sheet body of said first foam sheet inclinedly and gradually reducing said thickness of said base edge joint from said root portion to said end portion of said base edge joint so as to form said base connection surface facing upwards; moreover a thickness of said root portion of said covering edge joint equals to a thickness of said second foam sheet and a thickness of said end portion of said covering edge joint reduces to a thickness of said top fabric layer of said second foam sheet, said sheet body of said second foam sheet inclinedly and gradually reducing a thickness of said covering edge joint from said root portion to said end portion of said covering edge joint so as to form said covering connection surface facing downwards.

4. The seam structure as recited in claim 2 wherein the end portions of the base and covering edge joints each comprises said top fabric layer and a thin thickness of said sheet body.

5. The seam structure as recited in claim 4 further comprising a stitching seam to blind stitch up said base edge joint and said covering edge joint in order to reinforce said overlapped connection between said base connection surface and said covering connection surface said first and second foam sheets.

6. The seam structure as recited in claim 1 further comprising a covering flap which is an additional end extension of said top fabric layer integrally extended from said end portion of said covering edge joint and is glued on top of said top fabric layer of said first foam sheet.

7. The seam structure as recited in claim 6 further comprising a bottom covering flap which is glued along a bottom seam of said base and covering edge joints of said two foam sheets for covering said connection between said root portion of said covering edge joint and said end portion of said base edge joint.

8. The seam structure as recited in claim 6 further comprising a stitching seam to blind stitch up said base edge joint and said covering edge joint in order to reinforce said overlapped connection between said base connection surface and said covering connection surface said first and second foam sheets.

* * * * *